US008630490B2

(12) United States Patent
Denney et al.

(10) Patent No.: US 8,630,490 B2
(45) Date of Patent: Jan. 14, 2014

(54) SELECTING REPRESENTATIVE IMAGES FOR DISPLAY

(75) Inventors: Bradley Scott Denney, Irvine, CA (US); Anoop Korattikara Balan, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 627 days.

(21) Appl. No.: 12/906,107

(22) Filed: Oct. 17, 2010

(65) Prior Publication Data

US 2012/0096359 A1    Apr. 19, 2012

(51) Int. Cl.
G06K 9/46 (2006.01)
G06K 9/66 (2006.01)
G06K 9/62 (2006.01)

(52) U.S. Cl.
USPC .......................... 382/190; 382/224; 382/225

(58) Field of Classification Search
USPC .......................................... 382/190, 224, 225
See application file for complete search history.

(56) References Cited

U.S. PATENT DOCUMENTS

| | | | |
|---|---|---|---|
| 8,086,048 B2 * | 12/2011 | Naaman et al. | 382/225 |
| 8,379,939 B1 * | 2/2013 | Bourdev et al. | 382/118 |
| 2006/0020597 A1 * | 1/2006 | Keating et al. | 707/6 |
| 2009/0119596 A1 * | 5/2009 | Iwahara et al. | 715/730 |
| 2009/0199226 A1 * | 8/2009 | Suehiro et al. | 725/9 |
| 2012/0066219 A1 * | 3/2012 | Naaman et al. | 707/724 |
| 2013/0070975 A1 * | 3/2013 | Begeja et al. | 382/118 |

OTHER PUBLICATIONS

Azran, The Rendezvous Algorithm: Multiclass Semi-Supervised Learning with Markov Random Walks, 2007, In Proceedings of the 24$^{th}$ internation conference on machine learning.*

* cited by examiner

*Primary Examiner* — John Strege (74) *Attorney, Agent, or Firm* — Fitzpatrick, Cella, Harper & Scinto (57) ABSTRACT

Representative images are selected for display from a group. A dissimilarity measure is selected, by which to compute dissimilarities between features of respective images in the group. Dissimilarities between the images in the group are computed, based on the selected dissimilarity measure. A relative dissimilarity between each image and the other images in the group is determined, based on the relative dissimilarity between the feature of the image and the features of the other images in the group. An image in the group is selected as a representative image for display, using the relative dissimilarity of the image as a probability bias in the selection.

40 Claims, 5 Drawing Sheets

SELECTING REPRESENTATIVE IMAGES FOR DISPLAY

FIELD

The present disclosure relates to selecting representative images for display, and more particularly relates to selecting representative images for display from a group of images.

BACKGROUND

In the field of digital imaging, it is common to use a single image to represent a stored group of images. For example, a thumbnail image may be generated to represent images in a particular folder. In this way, it is ordinarily possible to provide a user with a visual indication of the general nature of the images that are stored in the folder.

SUMMARY

One shortcoming of using a single image to represent a group of images is that the single image may not represent the majority of the images in the group. For example, a representative image chosen at random may be significantly different from other images in the group, and thus may mislead the user as to the characteristics of the majority of images in the group.

The foregoing situation is addressed by selecting representative images for display according to the relative dissimilarity between the image and other images in the group. For example, the probability of selection is increased when a candidate image more closely resembles other images in the group, and is decreased when the candidate image less closely resembles other images in the group.

Thus, in an example embodiment described herein, representative images are selected for display from a group. A dissimilarity measure is selected, by which to compute dissimilarities between features of respective images in the group. Dissimilarities between the images in the group are computed, based on the selected dissimilarity measure. A relative dissimilarity between each image and the other images in the group is determined, based on the relative dissimilarity between the feature of the image and the features of the other images in the group. An image in the group is selected as a representative image for display, using the relative dissimilarity of the image as a probability bias in the selection.

By selecting representative images for display according to the relative dissimilarity between the image and other images in the group, it is ordinarily possible to provide the user with a more accurate representation of images in the group.

According to another example embodiment described herein, the selected images are displayed in a slideshow, with a relative frequency of display based on the relative dissimilarity of the image and the other images in the group.

This brief summary has been provided so that the nature of this disclosure may be understood quickly. A more complete understanding can be obtained by reference to the following detailed description and to the attached drawings.

DETAILED DESCRIPTION

Figure 1:
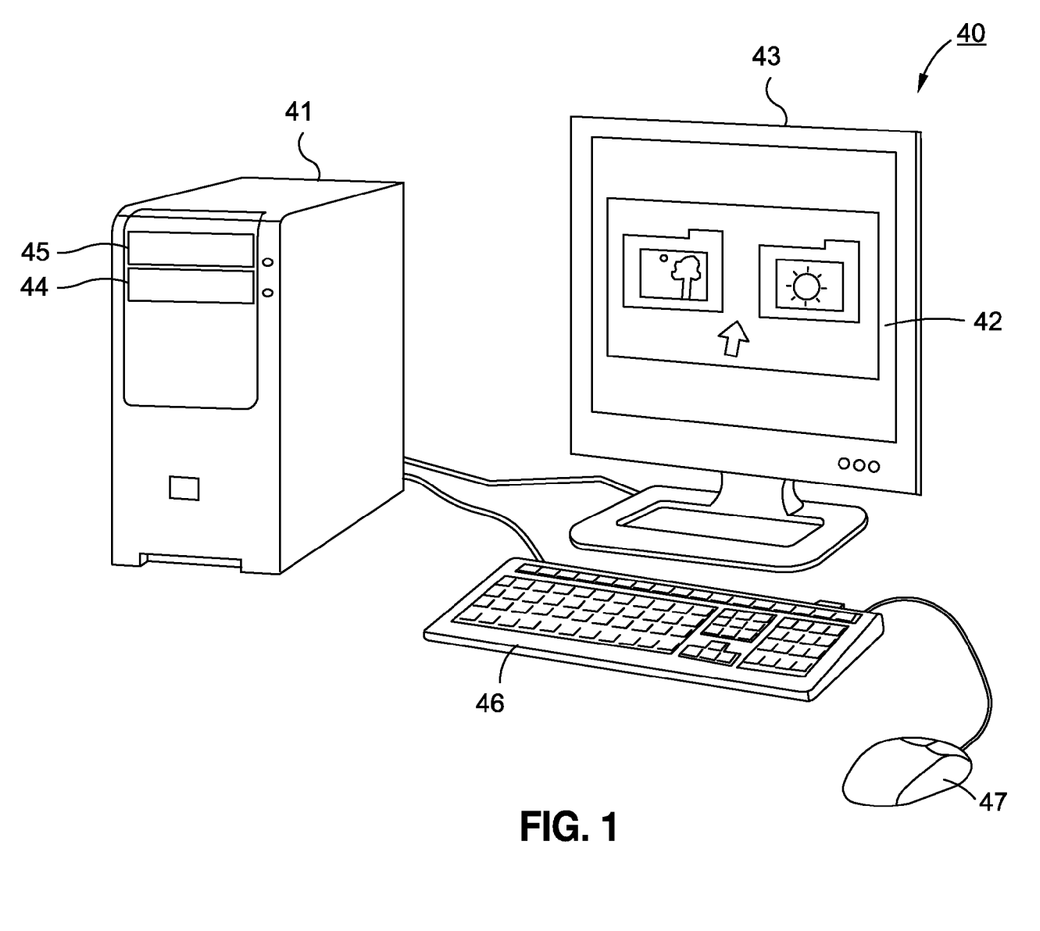
FIG. 1 is a representative view of computing equipment relevant to one example embodiment.

FIG. 1 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. Other devices for accessing information stored on removable or remote media may also be provided.

Of course, host computer 41 may acquire digital image data from other sources such as a digital video camera, a local area network or the Internet via a network interface. Likewise, host computer 41 may interface with other color output devices, such as color output devices accessible over a network interface.

As shown in FIG. 1, display screen 42 displays two slideshows of images. The process for generating the slideshows will be described more fully below.

While FIG. 1 depicts host computer 41 as a personal computer, computing equipment for practicing aspects of the present disclosure can be implemented in a variety of embodiments, including, for example, a digital camera, ultra-mobile computers, netbooks, portable media players or game consoles, among many others.

Figure 2:
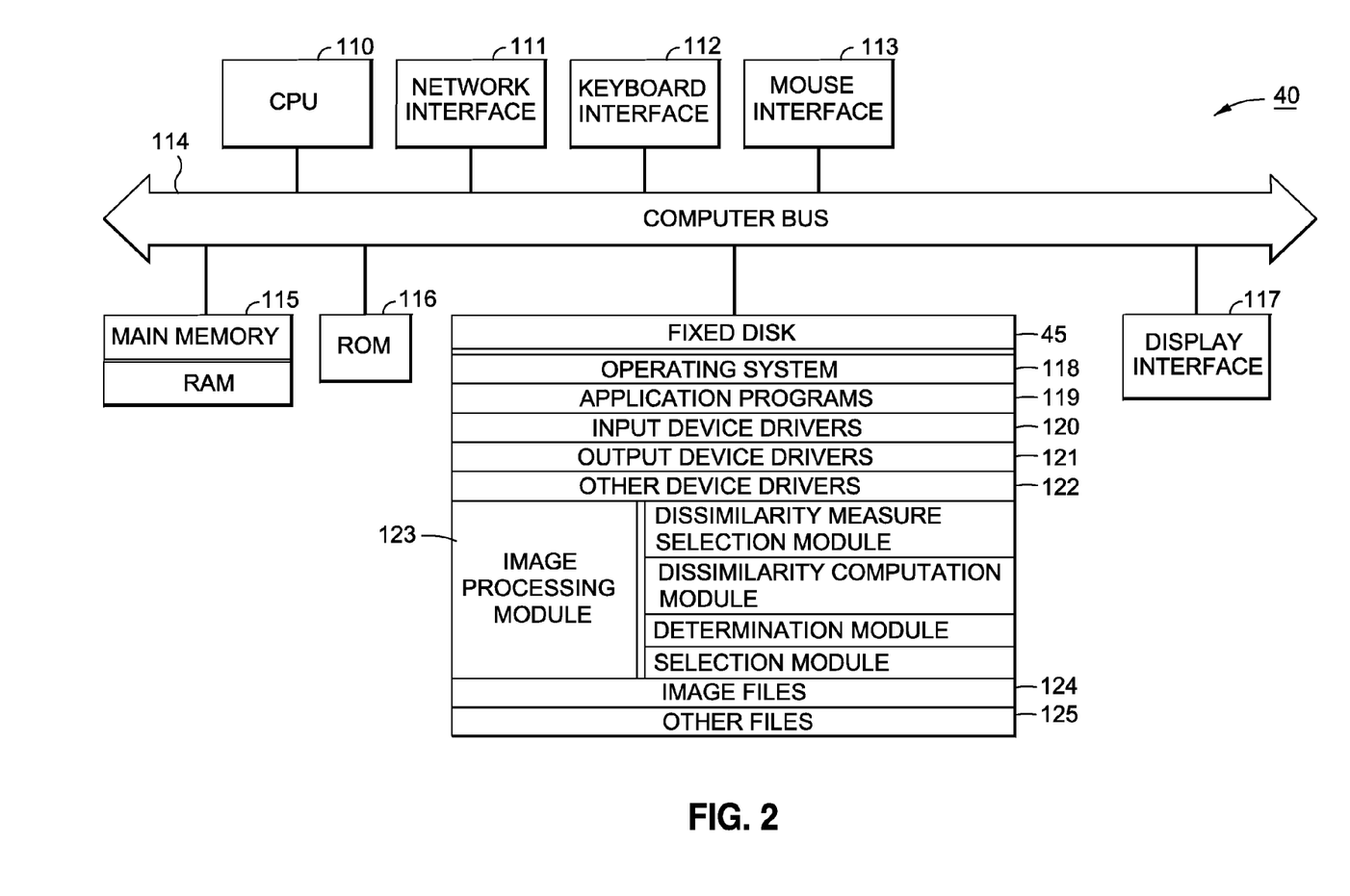
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 110 which interfaces with computer bus 114. Also interfacing with computer bus 114 are hard disk 45, network interface 111, random access memory (RAM) 115 for use as a main run-time transient memory, read only memory (ROM) 116, display interface 117 for monitor 43, keyboard interface 122 for keyboard 46, and mouse interface 123 for pointing device 47.

RAM 115 interfaces with computer bus 114 so as to provide information stored in RAM 115 to CPU 110 during execution of the instructions in software programs such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data such as color images or other information can be stored in RAM 115, so that the data can be accessed by CPU 110 during the execution of computer-executable software programs, to the extent that such software programs have a need to access and/or modify the data.

As also shown in FIG. 2, hard disk 45 contains computer-executable process steps for operating system 118, and application programs 119, such as graphic image management programs. Hard disk 45 also contains computer-executable process steps for device drivers for software interface to devices, such as input device drivers 120, output device drivers 121, and other device drivers 122. Image files 124, including color image files, and other files 125 are available for output to color output devices and for manipulation by application programs.

Image processing module 123 comprises computer-executable process steps, and generally comprises a dissimilarity measure selection module, a dissimilarity computation module, a determination module and a selection module. Image processing module 123 inputs a set of images, and selects particular images for display. More specifically, image processing module 123 comprises computer-executable process steps executed by a computer for causing the computer to perform a method for selecting representative images from a group for display, as described more fully below.

The computer-executable process steps for image processing module 123 may be configured as a part of operating system 118, as part of an output device driver such as a printer driver, or as a stand-alone application program such as a color management system. They may also be configured as a plug-in or dynamic link library (DLL) to the operating system, device driver or application program. For example, image processing module 123 according to example embodiments may be incorporated in an output device driver for execution in a computing device, such as a printer driver, embedded in the firmware of an output device, such as a printer, a camera or other mobile device with an output device, or provided in a stand-alone color management application for use on a general purpose computer. In one example embodiment described herein, image processing module 123 is incorporated directly into the operating system for general purpose host computer 41. It can be appreciated that the present disclosure is not limited to these embodiments and that the disclosed image processing module 123 may be used in other environments in which image management is used.

Figure 3:
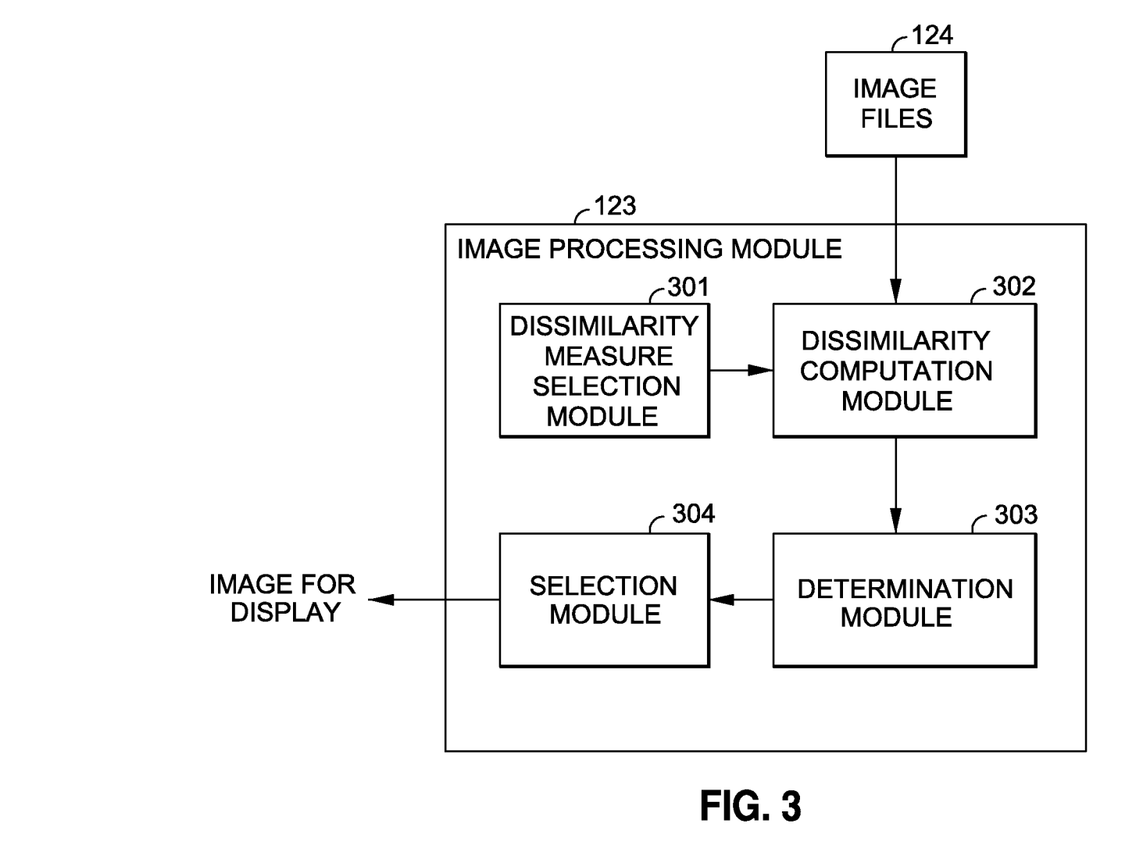
FIG. 3 is a representational view of an image processing module according to an example embodiment.

FIG. 3 illustrates the image processing module of FIG. 2 according to an example embodiment.

In particular, FIG. 3 illustrates an example of image processing module 123 in which the sub-modules of image processing module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, image processing module includes dissimilarity measure selection module 301 for selecting a dissimilarity measure by which to compute dissimilarities between features of respective images in the group. Dissimilarity computation module 302 computes dissimilarities between the images in the group, based on the selected dissimilarity measure. Determination module 303 determines a relative dissimilarity between each image and the other images in the group, based on the relative dissimilarity between the feature of the image and the features of the other images in the group. Selection module 304 selects an image in the group as a representative image for display, using the relative dissimilarity of the image as a probability bias in the selection. Each of these functions will be described more fully below.

Figure 4:
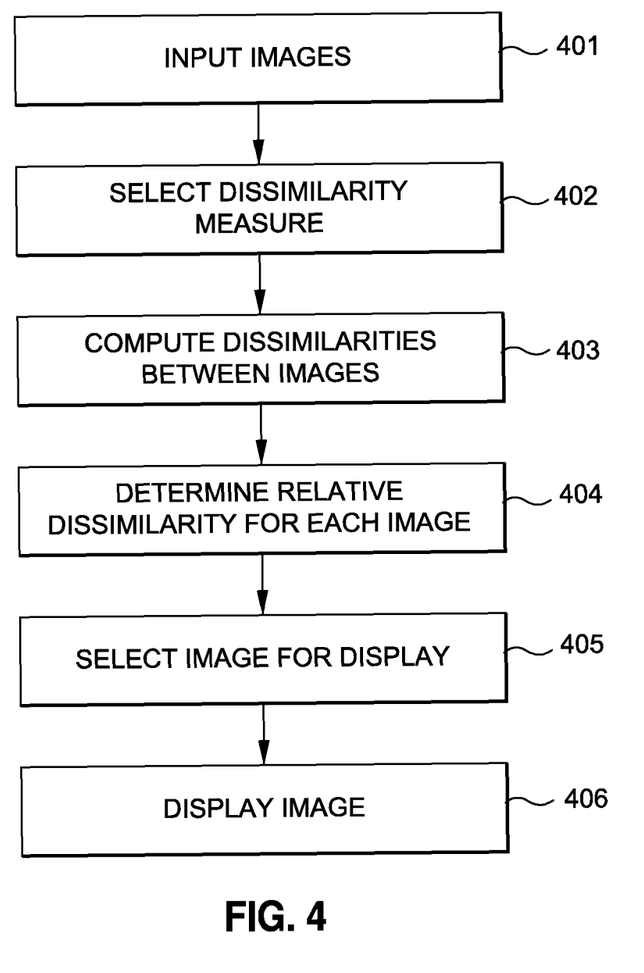
FIG. 4 is a flow diagram for explaining selection of images for display according to an example embodiment.

FIG. 4 is a flow diagram for explaining selection of images for display according to an example embodiment.

Briefly, in FIG. 4, representative images are selected for display from a group. A dissimilarity measure is selected, by which to compute dissimilarities between features of respective images in the group. Dissimilarities between the images in the group are computed, based on the selected dissimilarity measure. A relative dissimilarity between each image and the other images in the group is determined, based on the relative dissimilarity between the feature of the image and the features of the other images in the group. An image in the group is selected as a representative image for display, using the relative dissimilarity of the image as a probability bias in the selection.

In more detail, in step 401, a set of images is input. The images could be different or similar, and could be pre-clustered or not. For example, the images can be obtained from memory such as RAM 115, or may be received over a network via network interface 111.

In step 402, a dissimilarity measure is selected, by which to compare the images in the set. The dissimilarity measure quantifies the degree of similarity between two images. The choice of an image similarity measure depends on the modality of the images to be registered. Common examples of dissimilarity measures could include Euclidean or Chi-squared distance between edge direction histograms, or color histograms. In addition, the similarity measure can be chosen naively or based on the image feature(s) being employed as an intermediary step in determining dissimilarity.

In step 403, dissimilarities between images are computed, according to the selected dissimilarity measure. Specifically, a dissimilarity is calculated between each image and the other images in the set of images. Pair-wise dissimilarities can be computed between all the images in many ways.

For example, each image can be represented by an M-bin histogram of visual words. For any two images $I_1$ and $I_2$ with histograms $H_1=\{h_{11} \ldots h_{1M}\}$ and $H_2=\{h_{21} \ldots h_{2M}\}$, the dissimilarity between $I_1$ and $I_2$, $D(I_1, I_2)$ can be defined to be, for example, the chi-squared distance between their histograms:

$$D(I_1, I_2) = \chi^2(H_1, H_2) = \sum_{i=1}^{M} 2\frac{(h_{1i} - h_{2i})^2}{(h_{1i} + h_{2i})}.$$

In step 404, a relative dissimilarity between each image and the other images in the group is determined, based on the relative dissimilarity between the feature of the image and the features of the other images in the group.

In step 405, one or more images in the group is selected as a representative image for display, using the relative dissimilarity of the image as a probability bias in the selection. In particular, the probability of selection of the image is increased when the image has a low dissimilarity relative to other images in the group, and is decreased when the candidate image has a high dissimilarity relative to other images in the group.

In that regard, there are at least three methods which could be used to select the representative image for display. These methods will be described more fully below, in part with respect to FIGS. 5A and 5B.

In step 406, the selected image is displayed for a proportion of time. In particular, the selected image can be displayed in a slideshow with a relative frequency of display based on the relative dissimilarity of the image and the other images in the group. The display of the image could also be for a random amount of time.

In one example, if the group of images includes one or more subgroups, respective slideshows are generated for each of the subgroups. In another example, the group of images are stored in a folder, and the slideshow is displayed on top of an icon representing the folder. Given a cluster of images and the pair-wise distances between them computed above, the slideshow is "intelligent", meaning it shows important images with higher probability than outlier images, which helps a user to better visualize the distribution of images in the cluster. In that regard, independent slideshows could be calculated for each cluster of a group of clusters.

Moreover, as noted above, multiple images could be selected from the group. The multiple images could be used for display in single slideshow or in separate slideshows, among other display options.

Figure 5A:
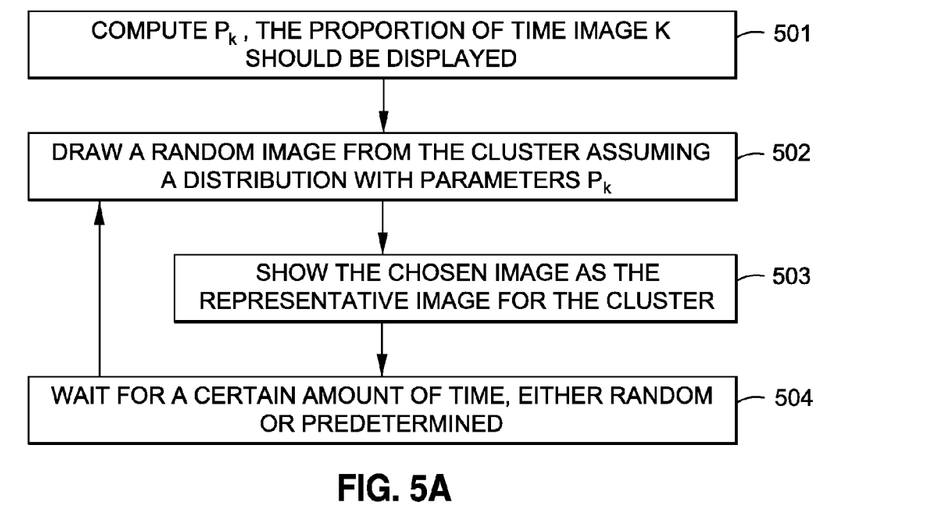
FIGS. 5A and 5B are flow diagrams indicating methods for selecting a representative image for display according to an example embodiment.
Figure 5B:
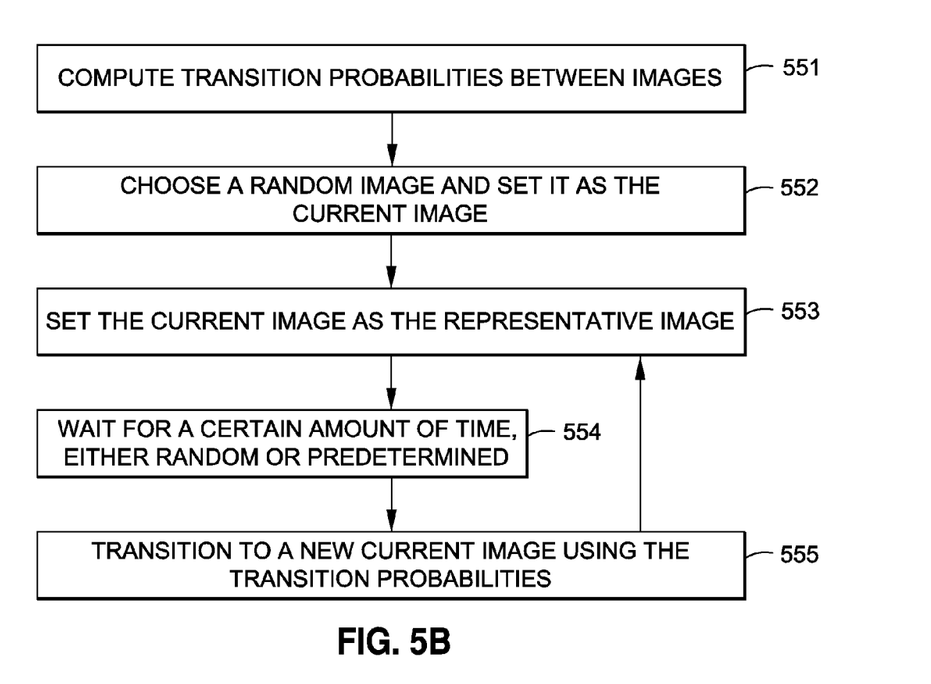

FIGS. 5A and 5B are flow diagrams for explaining the above methods for selecting a representative image for display according to example embodiments.

In particular, in the example of FIG. 5A, a distribution of dissimilarities of respective features of images in the group from a medoid value is chosen according to the selected dissimilarity measure, and the relative dissimilarity of a candidate image is determined by calculating the ratio of the likelihood probability of the feature of the candidate image being the medoid feature to the sum of the likelihood probabilities of all of the features in the other images in the set being medoid feature.

In one such example, the respective dissimilarities of the images to the medoid feature are chi-square distributed.

In step 501, the relative frequency of the candidate image is determined according to $$P_k = \frac{L_k}{\sum_{i=1}^{N} L_i},$$

wherein $P_k$ is the relative frequency of the candidate image, N is the total number of images in the group, and L is the likelihood of the feature of the candidate image being the medoid feature given the dissimilarities of the other features in the group to the candidate image feature.

More specifically, in this example, a medoid feature is computed. Medoids are representative objects of a data set or a cluster with a data set whose average dissimilarity to all the objects in the cluster is minimal. In a broad sense, the medoid may represent an "average" of all of the images in the group, according to the selected dissimilarity measure. Medoids are similar in concept to means, but medoids are always members of the data set. The particular medoid will depend on the selected dissimilarity measure.

In this method, the probability that a particular image is the medoid of the cluster is calculated, which determines how often it is selected for display. This is accomplished assuming that the cluster contains a sampling of images/features drawn from a random field with some underlying probability distribution of the images/features.

In that regard, as noted above, if it is assumed that the distances of the images to the medoid of the cluster are chi-square distributed with M degrees of freedom. Denoting D $(I_m, I_n)$ by $X_{mn}$, and the variance of the distances from any image to the kth image by $\sigma_k^2$, if the kth image was the medoid of the cluster, then the probability of observing an image Ii at distance $X_{ik}$ from Ik is $$C\left(\frac{X_{ik}}{\sigma_k}\right)^{M/2-1} \exp\left[-\left(\frac{X_{ik}}{2\sigma_k^2}\right)\right],$$

where C is a normalization constant that does not depend on $X_{ik}$.

Having observed the whole cluster, the likelihood of observing the cluster conditioned on the kth image being the medoid of the cluster can be calculated. This likelihood is given by $$L_k = \prod_{i \neq k} C\left(\frac{X_{ik}}{\sigma_k}\right)^{M/2-1} \exp\left[-\left(\frac{X_{ik}}{2\sigma_k^2}\right)\right].$$

By equating the derivative of the logarithm of this expression to zero, the maximum likelihood estimate for $\sigma_k$ can be found:

$$\hat{\sigma}_k^{ML} = \frac{1}{(N-1)(M-2)} \sum_{i \neq k} X_{ik}.$$

Assuming that each image is equally likely to be the medoid of the cluster, i.e. a uniform prior, the posterior probability that the kth image is the medoid of the cluster is $$P_k = \frac{L_k}{\sum_{i=1}^{N} L_i}.$$

Now, at every transition point in the display, the display is switched to the kth image with probability given by $P_k$.

In step 502, an image is drawn from the cluster, assuming a distribution with parameters $P_k$, as discussed above.

In step 503, the chosen image is shown as the representative image for the cluster.

In step 504, the process waits for a certain amount of time (either random or predetermined), and then proceeds back to step 502 to draw a new image.

In another example method, the transition probabilities from the candidate image to each of the images in the group are calculated based on the dissimilarities between the respective image features, and the relative dissimilarity of the candidate image is determined based on the relative frequency that an infinite-duration Markov process would visit the candidate image according to the transition probabilities. For example, the dissimilarities of the images to the medoid feature are chi-square distributed with M degrees of freedom, wherein $X_{ik}$ represents the dissimilarity from image i to image k, and wherein the transition probabilities from the candidate image to each of the images are defined as $$Pr(V_{t+1} = I_i | V_t = I_k) = \frac{M - X_{ik}}{\sum_{i \neq k} M - X_{ik}},$$

-continued where $$M = \max_i X_{ik} + \Delta_k \text{ for all } i \neq k,$$

wherein Vt represents the image being visited at the $t^{th}$ time and $\Delta_k$ is a non-negative constant.

In still another method corresponding to the flowchart of FIG. 5B, the selected image corresponds to an image currently visited by random walk according to a Markov process which transitions between the respective images, based on transition probabilities between the features of the respective images which are calculated according to the relative dissimilarities between the images.

Thus, in step 551, transition probabilities between images are computed.

In step 552, an image is chosen and set as a current image.

In step 553, the current image is set as the representative image.

In step 554, the process waits for a certain amount of time (either random or predetermined).

In step 555, the process transitions to a new current image using the transition probabilities, and then proceeds back to step 553 to set the new current image as the representative image.

A temporary inhibitory factor may be multiplied with transition probabilities leading to the candidate image after the candidate image is displayed, so as to temporarily inhibit the Markov process from remaining at or revisiting the candidate image. Moreover, the inhibitory factor can be used in combination with any of the other methods described above to make the slideshow more exhaustive. After an image is visited (displayed in the slide show) a temporary inhibitory effect is applied to all state transitions leading to that node. The node inhibition might be a factor α multiplied to the probabilities of transitions leading to that node. For example, the inhibition could be initially substantial but reduce back towards no inhibition over time, such as $$\alpha_i = 1 - \exp[-\lambda(t - \tau_i)],$$

where $\tau_i$ is the last time that node i was visited, t is the current time, and λ is some "forgetting" weight. The new transition probabilities from node j are calculated by renormalizing the inhibited transition probabilities from node j.

Also, to visualize multiple clusters at the same time, the slideshows for each cluster can be made independent, to prevent them from getting synchronized with each other. To be more precise, the transition times for each slideshow can be made to be independent draws from the same Poisson distribution.

By selecting representative images for display according to the relative dissimilarity between the images and the relative likelihood that the representative image could be the medoid image from the group, it is ordinarily possible to provide the user with a more accurate representation of images in the group.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of selecting representative images from a group, comprising:

selecting a dissimilarity measure by which to compute dissimilarities between features of respective images in the group;

computing dissimilarities between the images in the group, based on the selected dissimilarity measure;

determining a relative dissimilarity between each image and the other images in the group, based on the relative dissimilarity between the feature of the image and the features of the other images in the group; and selecting an image in the group as a representative image for display, using the relative dissimilarity of the image as a probability bias in the selection, wherein a distribution of dissimilarities of respective features of images in the group from the average value is chosen according to the selected dissimilarity measure, and wherein the determining step determines the relative dissimilarity of a candidate image by calculating the ratio of the likelihood probability of the feature of the candidate image being a medoid feature to the sum of the likelihood probabilities of all of the features in the other images in the set being the medoid feature.

2. The method according to claim 1, further comprising a display step of displaying selected images in a slideshow with a relative frequency of display based on the relative dissimilarity of the image and the other images in the group.

3. The method according to claim 1, wherein the respective dissimilarities of the images to the medoid feature are chi-square distributed, wherein the relative frequency of the candidate image is determined according to $$P_k = \frac{L_k}{\sum_{i=1}^{N} L_i},$$

wherein $P_k$ is the relative frequency of the candidate image, N is the total number of images in the group, and L is the likelihood of the feature of the candidate image being the medoid feature given the dissimilarities of the other features in the group to the candidate image feature.

4. The method according to claim 1, wherein transition probabilities from the candidate image to each of the images in the group are calculated based on the dissimilarities between the respective image features, and wherein the determining step determines the relative dissimilarity of the candidate image based on the relative frequency that an infinite-duration Markov process would visit the candidate image according to the transition probabilities.

5. The method according to claim 4, wherein the dissimilarities of the images to a medoid feature are chi-square distributed with M degrees of freedom, wherein $X_{ik}$ represents the dissimilarity from image I to image K, and wherein the transition probabilities from the candidate image to each of the images are defined as $$Pr(V_{t+1} = I_i \mid V_t = I_k) = \frac{M - X_{ik}}{\sum_{i \neq k} M - X_{ik}}$$

where $$M = \max_i X_{ik} + \Delta_k \text{ for all } i \neq k,$$

wherein Vt represents the image being visited at the $t^{th}$ time.

6. The method according to claim 1, wherein the selected image corresponds to an image currently visited by a random walk according to a Markov process which transitions between the respective images, based on transition probabilities between the features of the respective images which are calculated according to the relative dissimilarities between the images.

7. The method according to claim 6, wherein a temporary inhibitory factor is multiplied with transition probabilities leading to the candidate image after the candidate image is displayed, so as to temporarily inhibit the Markov process from remaining at or revisiting the candidate image.

8. The method according to claim 1, wherein the selected image is displayed in a slideshow for a random amount of time.

9. The method according to claim 2, wherein if the group of images includes one or more subgroups, respective slideshows are generated for each of the subgroups.

10. The method according to claim 2, wherein the group of images are stored in a folder, and wherein the slideshow is displayed on top of an icon representing the folder.

11. An image processing apparatus for selecting representative images from a group, comprising:
a computer-readable memory constructed to store computer-executable process steps; and
a processor constructed to execute the computer-executable process steps stored in the memory;
wherein the process steps stored in the memory cause the processor to:
select a dissimilarity measure by which to compute dissimilarities between features of respective images in the group;
compute dissimilarities between the images in the group, based on the selected dissimilarity measure;
determine a relative dissimilarity between each image and the other images in the group, based on the relative dissimilarity between the feature of the image and the features of the other images in the group; and
select an image in the group as a representative image for display, using the relative dissimilarity of the image as a probability bias in the selection,
wherein a distribution of dissimilarities of respective features of images in the group from the average value is chosen according to the selected dissimilarity measure, and wherein the determining step determines the relative dissimilarity of a candidate image by calculating the ratio of the likelihood probability of the feature of the candidate image being a medoid feature to the sum of the likelihood probabilities of all of the features in the other images in the set being the medoid feature.

12. The apparatus according to claim 11, further comprising a display step of displaying selected images in a slideshow with a relative frequency of display based on the relative dissimilarity of the image and the other images in the group.

13. The apparatus according to claim 11, wherein the respective dissimilarities of the images to the medoid feature are chi-square distributed, wherein the relative frequency of the candidate image is determined according to $$P_k = \frac{L_k}{\sum_{i=1}^{N} L_i},$$

wherein $P_k$ is the relative frequency of the candidate image, N is the total number of images in the group, and L is the likelihood of the feature of the candidate image being the medoid feature given the dissimilarities of the other features in the group to the candidate image feature.

14. The apparatus according to claim 11, wherein transition probabilities from the candidate image to each of the images in the group are calculated based on the dissimilarities between the respective image features, and wherein the determining step determines the relative dissimilarity of the candidate image based on the relative frequency that an infinite-duration Markov process would visit the candidate image according to the transition probabilities.

15. The apparatus according to claim 14, wherein the dissimilarities of the images to a medoid feature are chi-square distributed with M degrees of freedom, wherein $X_{ik}$ represents the dissimilarity from image I to image K, and wherein the transition probabilities from the candidate image to each of the images are defined as $$Pr(V_{t+1} = I_i \mid V_t = I_k) = \frac{M - X_{ik}}{\sum_{i \neq k} M - X_{ik}}$$

where $$M = \max_i X_{ik} + \Delta_k \text{ for all } i \neq k,$$

wherein Vt represents the image being visited at the $t^{th}$ time.

16. The apparatus according to claim 11, wherein the selected image corresponds to an image currently visited by a random walk according to a Markov process which transitions between the respective images, based on transition probabilities between the features of the respective images which are calculated according to the relative dissimilarities between the images.

17. The apparatus according to claim 16, wherein a temporary inhibitory factor is multiplied with transition probabilities leading to the candidate image after the candidate image is displayed, so as to temporarily inhibit the Markov process from remaining at or revisiting the candidate image.

18. The apparatus according to claim 11, wherein the selected image is displayed in a slideshow for a random amount of time.

19. The apparatus according to claim 12, wherein if the group of images includes one or more subgroups, respective slideshows are generated for each of the subgroups.

20. The apparatus according to claim 12, wherein the group of images are stored in a folder, and wherein the slideshow is displayed on top of an icon representing the folder.

21. An image processing module stored on a non-transitory computer-readable storage medium, for selecting respective images from a group, comprising:
a dissimilarity measure selection module for selecting a dissimilarity measure by which to compute dissimilarities between features of respective images in the group;
a dissimilarity computation module for computing dissimilarities between the images in the group, based on the selected dissimilarity measure;
a determination module for determining a relative dissimilarity between each image and the other images in the group, based on the relative dissimilarity between the feature of the image and the features of the other images in the group; and
a selection module for selecting an image in the group as a representative image for display, using the relative dissimilarity of the image as a probability bias in the selection, wherein a distribution of dissimilarities of respective features of images in the group from the average value is chosen according to the selected dissimilarity measure, and wherein the determining step determines the relative dissimilarity of a candidate image by calculating the ratio of the likelihood probability of the feature of the candidate image being a medoid feature to the sum of the likelihood probabilities of all of the features in the other images in the set being the medoid feature.

22. The image processing module according to claim 21, further comprising a display step of displaying selected images in a slideshow with a relative frequency of display based on the relative dissimilarity of the image and the other images in the group.

23. The image processing module according to claim 21, wherein the respective dissimilarities of the images to the medoid feature are chi-square distributed, wherein the relative frequency of the candidate image is determined according to $$P_k = \frac{L_k}{\sum_{i=1}^{N} L_i},$$

wherein $P_k$ is the relative frequency of the candidate image, N is the total number of images in the group, and L is the likelihood of the feature of the candidate image being the medoid feature given the dissimilarities of the other features in the group to the candidate image feature.

24. The image processing module according to claim 21, wherein transition probabilities from the candidate image to each of the images in the group are calculated based on the dissimilarities between the respective image features, and wherein the determining step determines the relative dissimilarity of the candidate image based on the relative frequency that an infinite-duration Markov process would visit the candidate image according to the transition probabilities.

25. The image processing module according to claim 24, wherein the dissimilarities of the images to a medoid feature are chi-square distributed with M degrees of freedom, wherein $X_{ik}$ represents the dissimilarity from image I to image K, and wherein the transition probabilities from the candidate image to each of the images are defined as $$Pr(V_{t+1} = I_i \mid V_t = I_k) = \frac{M - X_{ik}}{\sum_{i \neq k} M - X_{ik}},$$

where $$M = \max_i X_{ik} + \Delta_k \text{ for all } i \neq k,$$

wherein Vt represents the image being visited at the $t^{th}$ time.

26. The image processing module according to claim 21, wherein the selected image corresponds to an image currently visited by a random walk according to a Markov process which transitions between the respective images, based on transition probabilities between the features of the respective images which are calculated according to the relative dissimilarities between the images.

27. The image processing module according to claim 26, wherein a temporary inhibitory factor is multiplied with transition probabilities leading to the candidate image after the candidate image is displayed, so as to temporarily inhibit the Markov process from remaining at or revisiting the candidate image.

28. The image processing module according to claim 21, wherein the selected image is displayed in a slideshow for a random amount of time.

29. The image processing module according to claim 22, wherein if the group of images includes one or more subgroups, respective slideshows are generated for each of the subgroups.

30. The image processing module according to claim 22, wherein the group of images are stored in a folder, and wherein the slideshow is displayed on top of an icon representing the folder.

31. A non-transitory computer-readable storage medium storing computer-executable process steps for causing a computer to perform a method for selecting representative images from a group, the method comprising:
   selecting a dissimilarity measure by which to compute dissimilarities between features of respective images in the group;
   computing dissimilarities between the images in the group, based on the selected dissimilarity measure;
   determining a relative dissimilarity between each image and the other images in the group, based on the relative dissimilarity between the feature of the image and the features of the other images in the group; and
   selecting an image in the group as a representative image for display, using the relative dissimilarity of the image as a probability bias in the selection,
   wherein a distribution of dissimilarities of respective features of images in the group from the average value is chosen according to the selected dissimilarity measure, and wherein the determining step determines the relative dissimilarity of a candidate image by calculating the ratio of the likelihood probability of the feature of the candidate image being a medoid feature to the sum of the likelihood probabilities of all of the features in the other images in the set being the medoid feature.

32. The computer-readable storage medium according to claim 31, further comprising a display step of displaying selected images in a slideshow with a relative frequency of display based on the relative dissimilarity of the image and the other images in the group.

33. The computer-readable storage medium according to claim 31, wherein the respective dissimilarities of the images to the medoid feature are chi-square distributed, wherein the relative frequency of the candidate image is determined according to $$P_k = \frac{L_k}{\sum_{i=1}^{N} L_i},$$

wherein $P_k$ is the relative frequency of the candidate image, N is the total number of images in the group, and L is the likelihood of the feature of the candidate image being the medoid feature given the dissimilarities of the other features in the group to the candidate image feature.

34. The computer-readable storage medium according to claim 31, wherein transition probabilities from the candidate image to each of the images in the group are calculated based on the dissimilarities between the respective image features, and wherein the determining step determines the relative dissimilarity of the candidate image based on the relative frequency that an infinite-duration Markov process would visit the candidate image according to the transition probabilities.

35. The computer-readable storage medium according to claim 34, wherein the dissimilarities of the images to a medoid feature are chi-square distributed with M degrees of freedom, wherein $X_{ik}$ represents the dissimilarity from image I to image K, and wherein the transition probabilities from the candidate image to each of the images are defined as $$Pr(V_{t+1} = I_i \mid V_t = I_k) = \frac{M - X_{ik}}{\sum_{i \neq k} M - X_{ik}}$$

where $$M = \max_i X_{ik} + \Delta_k \text{ for all } i \neq k,$$

wherein Vt represents the image being visited at the $t^{th}$ time.

36. The computer-readable storage medium according to claim 31, wherein the selected image corresponds to an image currently visited by a random walk according to a Markov process which transitions between the respective images, based on transition probabilities between the features of the respective images which are calculated according to the relative dissimilarities between the images.

37. The computer-readable storage medium according to claim 36, wherein a temporary inhibitory factor is multiplied with transition probabilities leading to the candidate image after the candidate image is displayed, so as to temporarily inhibit the Markov process from remaining at or revisiting the candidate image.

38. The computer-readable storage medium according to claim 31, wherein the selected image is displayed in a slideshow for a random amount of time.

39. The computer-readable storage medium according to claim 32, wherein if the group of images includes one or more subgroups, respective slideshows are generated for each of the subgroups.

40. The computer-readable storage medium according to claim 32, wherein the group of images are stored in a folder, and wherein the slideshow is displayed on top of an icon representing the folder.

* * * * *